(12) United States Patent
Hinds et al.

(10) Patent No.: US 6,810,245 B1
(45) Date of Patent: Oct. 26, 2004

(54) INTELLIGENT REMOTE SOFTWARE LOADING METHOD FOR WIRELESS PORTABLE COMMUNICATION DEVICE

(75) Inventors: Mark Hinds, Libertyville, IL (US); Robert P. Mundschau, Harvard, IL (US)

(73) Assignee: Motorola, Inc., Schaumburg, IL (US)

( * ) Notice: Subject to any disclaimer, the term of this patent is extended or adjusted under 35 U.S.C. 154(b) by 120 days.

(21) Appl. No.: 10/230,321

(22) Filed: Aug. 28, 2002

(51) Int. Cl.[7] ............................................... H04Q 7/20
(52) U.S. Cl. ...................... 455/418; 455/419; 709/227
(58) Field of Search .............................. 455/418, 419, 455/420, 411, 414.1, 550, 186.1; 709/245, 200, 232, 217–219, 227, 223, 224; 370/401, 328, 403, 404, 338, 351–356; 713/168, 169, 175

(56) References Cited

U.S. PATENT DOCUMENTS

| | | | | |
|---|---|---|---|---|
| 5,887,254 A | * | 3/1999 | Halonen ..................... 455/419 |
| 5,909,437 A | * | 6/1999 | Rhodes et al. ............... 370/349 |
| 6,308,061 B1 | * | 10/2001 | Criss et al. ................. 455/418 |
| 6,324,411 B1 | * | 11/2001 | Genell ........................ 455/561 |
| 6,587,684 B1 | * | 7/2003 | Hsu et al. .................... 455/419 |
| 6,622,017 B1 | * | 9/2003 | Hoffman ..................... 455/419 |
| 6,671,509 B1 | * | 12/2003 | Tanaka et al. ............... 455/419 |

* cited by examiner

Primary Examiner—Jean Gelin
(74) Attorney, Agent, or Firm—Shigeharu Furukawa

(57) ABSTRACT

In a wireless communication system (100), a method for a wireless portable communication device (104) having a first version of native software (108) to download a second version of native software (114) maintained in a communication network memory (110) by making memory space available in memory (106) of the wireless portable communication device (104) for the second version of native software (114) while maintaining communication with the communication network (102).

16 Claims, 4 Drawing Sheets

INTELLIGENT REMOTE SOFTWARE LOADING METHOD FOR WIRELESS PORTABLE COMMUNICATION DEVICE

FIELD OF THE INVENTION

The present invention relates generally to the field of radio communications. More specifically, the present invention relates to a method of loading software remotely in a wireless portable communication device.

BACKGROUND OF THE INVENTION

For a wireless portable communication device, such as a wireless radiotelephone, an ability to download software remotely, such as Over-the-Air (OTA) method, is increasingly becoming more desirable. Presently, a wireless portable communication device such as a cellular telephone is loaded with appropriate and complete set of software at a factory well before reaching an end user. This set of software, which is specifically designed for a particular set of cellular telephones such as a particular cellular telephone series or cellular telephones having the same processor, is called native software.

One advantage of loading a complete set of native software into a cellular phone before sale is that upon purchase, the user able to start using the cellular telephone almost immediately. However, once the cellular telephone is sold, it mostly remains in the same software configuration, and software modification or update is very limited. Some OTA software upgrades currently available involve simply unlocking features that are already loaded and making them available for the user, and do not involve replacing the existing native software. If the user desires to be able to use a new and upgraded version of the native software or compatible but different native software which may have features previously unavailable, the user would have to either purchase a new cellular telephone that is loaded with such native software, or miss the benefit of such new native software.

Accordingly, there is a need for a method allowing the end user to download native software into a wireless portable communication device which already has a version of native software, and if desired and available, to completely replace the existing version of native software residing in the wireless portable communication device.

SUMMARY OF THE INVENTION

The present invention describes a method for a wireless portable communication device to download any available native software over the air from a wireless communication network. The wireless portable communication device makes a request to download native software to the network. As a part of making the request, the wireless portable communication device identifies itself and its current native software and hardware configuration to the network to have the network determine its eligibility and availability of downloadable native software versions. The wireless portable communication device then enters the downloading mode, makes memory space available in its memory for the temporary downloading function, and executes the temporary downloading function to download the desired native software. The native software to be downloaded by the wireless portable communication device is in an appropriate binary image having the software's internal address references resolved specifically for the requesting wireless portable communication device.

DETAILED DESCRIPTION OF PREFERRED EMBODIMENTS

Figure 1:
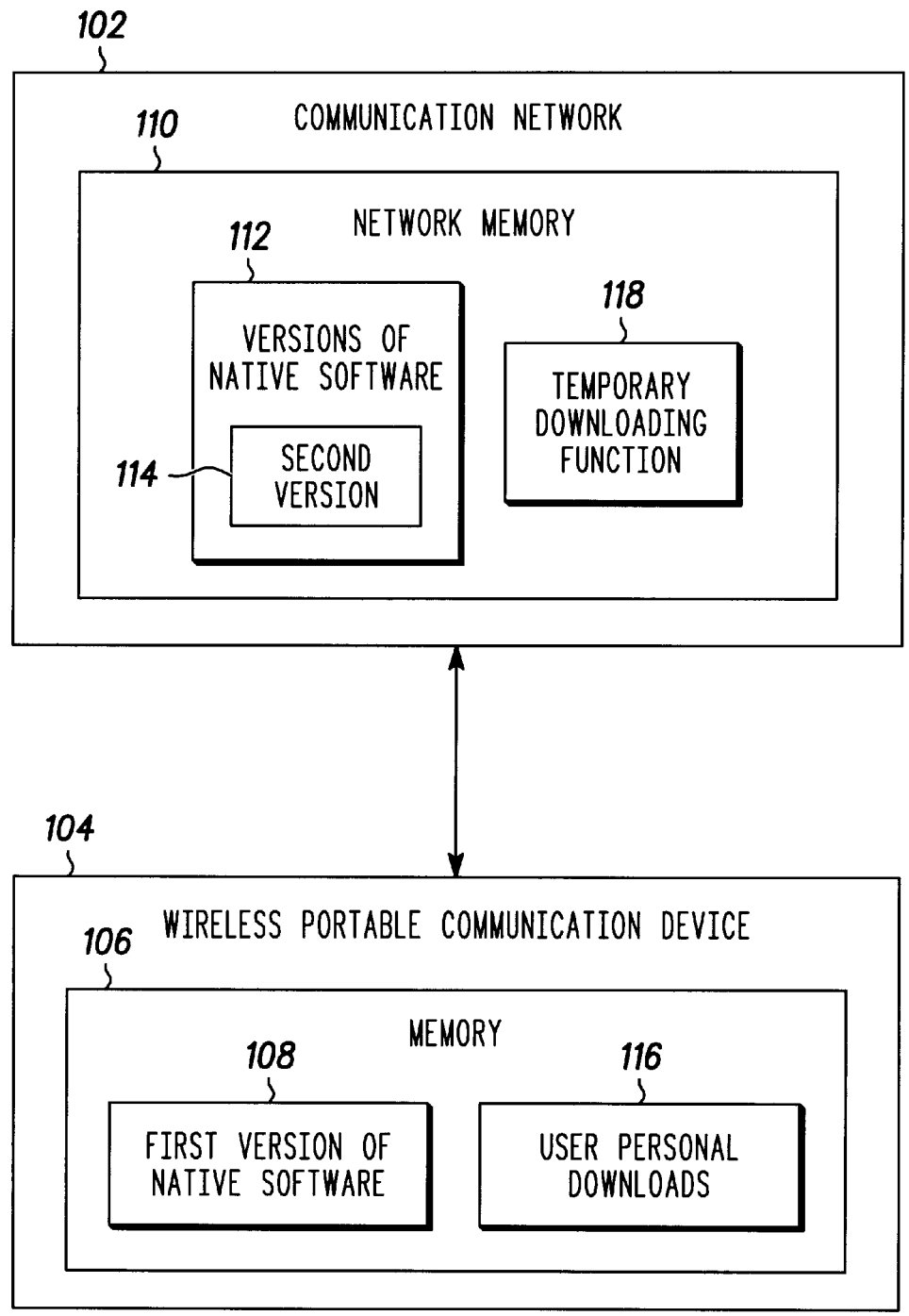
FIG. 1 is a block diagram of a wireless communication system comprising a communication network and a portable device.

The present invention provides a method for a wireless portable communication device to replace its existing native software residing in its memory with a different version of native software by a user. FIG. 1 illustrates an exemplary communication system (100) of the present invention comprising a communication network (102) and a wireless portable communication device (104). The wireless portable communication device (104) has memory (106) which holds a first version of native software (108) that has been installed by the manufacturer at the time of the production. The communication network (102) has a network memory (110) which contains multiple versions of native software (112) for multiple wireless portable communication devices used in the communication system (100). A second version of native software (114) for the wireless portable communication device (104), which the device manufacturer or the network provider has introduced as a new version of native software for the wireless portable communication device (104), is one of the multiple versions of native software (112) contained in the network memory (110). A reason for introducing a new version may be for improving performance such as new features previously unavailable or for providing a cleaner and bug-free version of the current or existing version of native software. The wireless portable communication device (104) is one of the multiple wireless portable communication devices used in the communication system (100). The wireless portable communication device (104) may further contain in its memory (106) user personal downloads (116) which are not essential to the core operation of the device and may be comprised of the user's phonebook, plug-in applications, and other non-essential data. The communication network (102) may further have in the network memory (110) a temporary downloading function (118), which is downloaded to the wireless portable communication device prior to downloading the second version of native software (114), and maintains and controls communication between the wireless portable communication device (104) and the communication network (102) during downloading the second version of native software (114). The present invention describes a method for the wireless portable communication device (104) to replace its currently residing first native software (108) by downloading a second version of native software (110) using Over-the-Air (OTA) method. The end user may choose the second version of native software from multiple versions of native software that are available for his wireless portable communication device. The second version of native software to be downloaded may represent a partial or complete replacement of the first version of native software currently residing in the memory of the wireless portable communication device.

Figure 2:
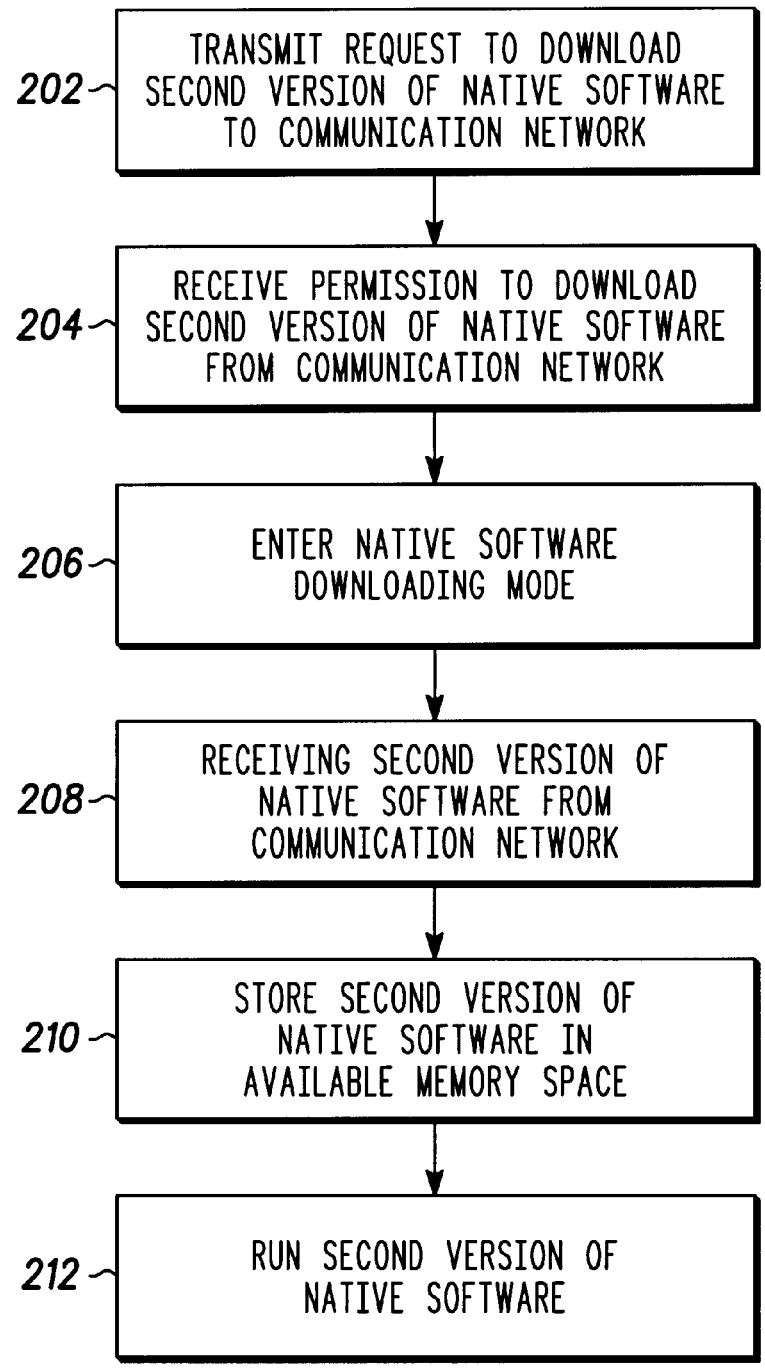
FIG. 2 is a flowchart of a first preferred embodiment of the present invention.

FIG. 2 illustrates an exemplary flowchart (200) of a first preferred embodiment of the present invention. When the user of the wireless portable communication device selects to download the second version of native software (114) from the communication network (102), in step 202, the wireless portable communication device (104) transmits a request to the communication network (102) to download the second version of native software (114). Then in step 204, the wireless portable communication device (104) receives a permission from the communication network (102) to download the second version of native software (114). Upon receiving the permission, the wireless portable communication device (104) enters a native software downloading mode in step 206, and then begins receiving the second version of native software (114) from the communication network (102) in step 208. In step 210, the wireless portable communication device (104) stores the received second version of native software (114) in its memory, and then in step 212, runs the second version of native software.

Figure 3:
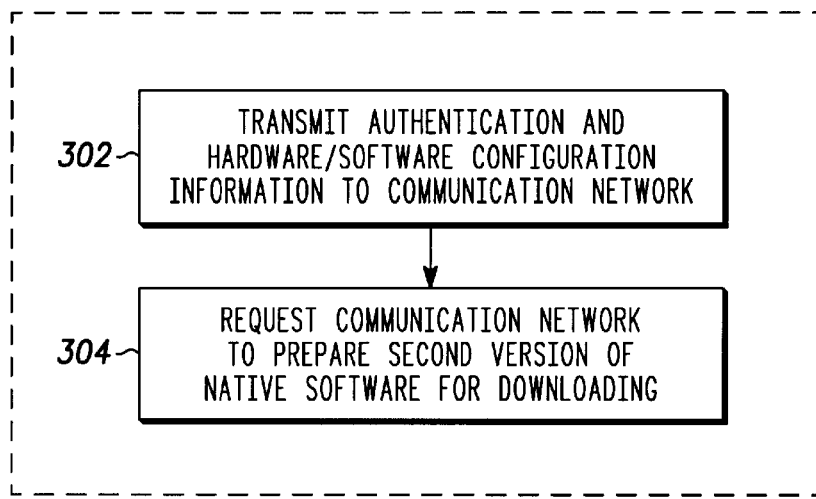
FIG. 3 is a flowchart illustrating the steps of transmitting request to download.

FIG. 3 illustrates an exemplary detail of the step 202 of transmitting a request to the communication network (102) to download the second version of native software (114). The step 202 comprises step 302 of transmitting authentication information validating the eligibility of the wireless portable communication device (104) to receive the second version of native software (114), and hardware and software configurations of the wireless portable communication device. The step 202 further comprises step 304 of transmitting a request to have the second version of native software (114) prepared for downloading to the wireless portable communication device (104). The prepared second version of native software is preferably in an appropriate binary image having internal address references of the software resolved specifically for the wireless portable communication device (104).

Figure 4:
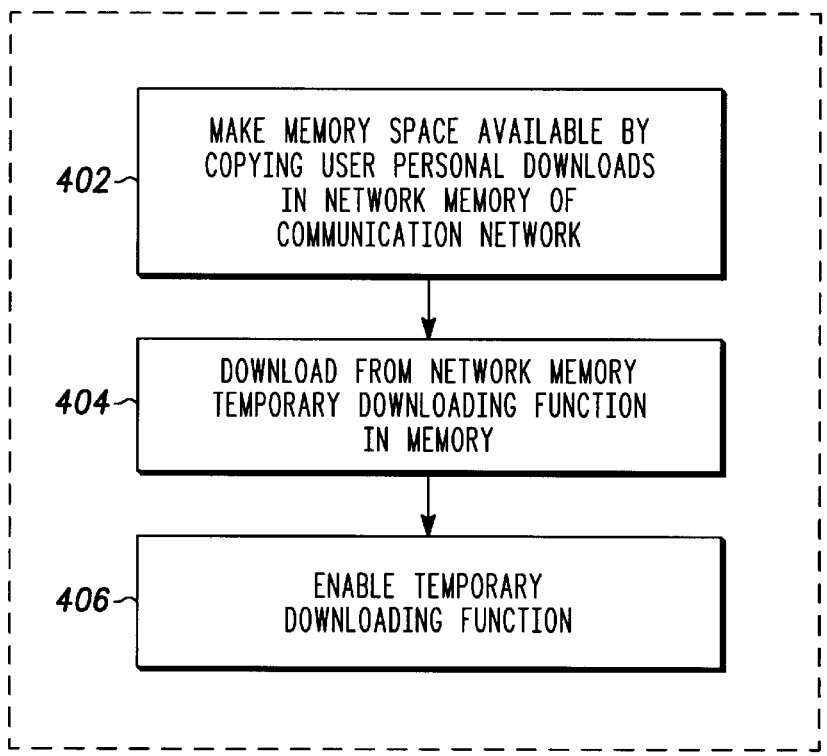
FIG. 4 is a flowchart illustrating the steps in the downloading mode.

FIG. 4 illustrates an exemplary detail of the wireless portable communication device (104) entering the native software downloading mode in step 206. When the wireless portable communication device enters the native software downloading mode in step 206, it makes memory space available by copying the user personal downloads (116) in the network memory (110) of the communication network (102) in step 402. For copying the user personal downloads in the network memory, the wireless portable communication device may first encrypt the user personal downloads and then transmit the encrypted user personal downloads to the communication network. In step 404, the wireless portable communication device (104) downloads the temporary downloading function (118) form the communication network (102), and stores this program in the memory (106) which has been made available. In step 406, the task of maintaining and controlling communication during downloading the second version of native software (114) is transferred to the temporary downloading function (118) now residing in the wireless portable communication device (104). The wireless portable communication device (104) then, as shown in step 208, receives the second version of native software (114) and, in step 210, stores it in the memory space made available as describe in FIG. 4, step 402. The second version of native software (114) may be stored by writing it over the existing first version of native software (108) in the memory (106) of the wireless portable communication device (104).

Figure 5:
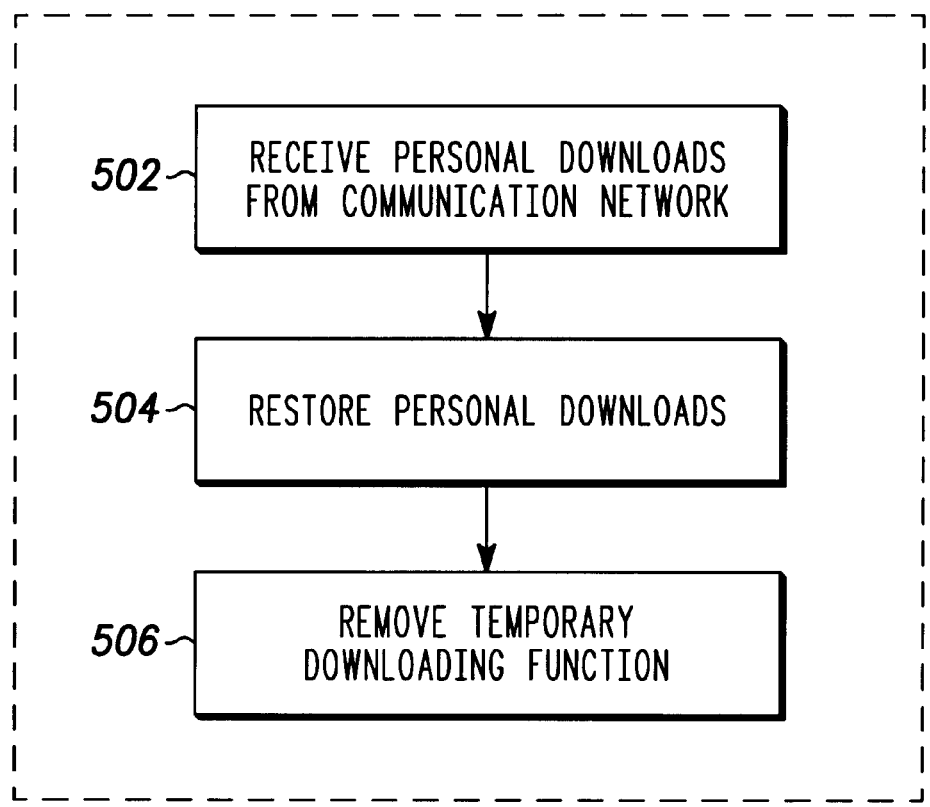
FIG. 5 is a flowchart illustrating the steps of running the second version of native software.

When the downloading of the second version of native software (114) is completed, the wireless portable communication device (104) switches to the second version of native software (114) for its operation in step 212. As illustrated in FIG. 5, running the second version of native software (114) may further comprise the following steps: receiving from the communication network (102) the user personal downloads (116), which may have been encrypted in step 402, copied in the network memory of the communication network (102) in step 502; restoring the user personal downloads (116) in the wireless portable communication device (104) in step 504; and removing the temporary downloading function (118) from the memory (106) after the second version of native software (114) is stored in the memory space. Once the wireless portable communication device finishes receiving the user personal downloads, it may restore the user personal downloads by decrypting the user personal downloads if the user personal downloads have been encrypted in step 402.

While the preferred embodiments of the invention have been illustrated and described, it is to be understood that the invention is not so limited. Numerous modifications, changes, variations, substitutions and equivalents will occur to those skilled in the art without departing from the spirit and scope of the present invention as defined by the appended claims.

What is claimed is:

1. A method for a wireless portable communication device having a first version of native software and user personal downloads in memory for downloading from a communication network a second version of native software, the communication network storing in a network memory a plurality of versions of native software for the wireless portable communication device wherein the second version of native software for the wireless portable communication device is one of the plurality of versions of native software for the wireless portable communication device, the method comprising steps of:

transmitting to the communication network a request to download the second version of native software;

receiving from the communication network a permission to download the second version of native software;

making memory space available by copying the user personal downloads in the network memory of the communication network;

downloading in the memory space a temporary downloading function capable of maintaining and controlling communication between the wireless portable communication device and the communication network during downloading the second version of native software;

enabling the temporary downloading function;

receiving from the communication network the second version of native software;

storing the second version of native software in the memory of the wireless portable communication device; and operating the wireless portable communication device using the second version of native software.

2. A method according to claim 1, wherein the step of transmitting a request to download further comprises transmitting an authentication information validating eligibility of the wireless portable communication device to receive the second version of native software from the communication network and hardware and software configurations of the wireless portable communication device to the communication network.

3. A method according to claim 2, wherein the step of transmitting the hardware and software configurations of the wireless portable communication device to the communication network further comprising a step of requesting the communication network to prepare the second version of native software for downloading to the wireless portable communication device.

4. A method according to claim 3, wherein the prepared second version of native software is in an appropriate binary image having internal address references of the software resolved specifically for the wireless portable communication device.

5. A method according to claim 1, wherein the step of operating the wireless portable communication device using the second version of native software further comprises steps of:
- receiving from the communication network the user personal downloads copied in the network memory of the communication network; and
- restoring the user personal downloads in the wireless portable communication device.

6. A method according to claim 1, wherein the step of storing the second version of native software in the memory of the wireless portable communication device further comprises a step of overwriting the fast native software and the user personal downloads in the memory of the wireless portable communication device with the second version of native software.

7. A method according to claim 1 further comprising a step of removing the temporary downloading function from the memory of the wireless portable communication device after the second version of native software is stored in the memory.

8. A method for a wireless portable communication device having a first version of native software and user personal downloads in memory for creating memory space available for downloading from a communication network a second version of native software in an appropriate binary image having internal address references resolved specifically for the wireless portable communication device, the communication network storing in a network memory a plurality of versions of native software for the wireless portable communication device wherein the second version of native software for the wireless portable communication device is one of the plurality of versions of native software for the wireless portable communication device and a temporary downloading function capable of maintaining and controlling communication between the wireless portable communication device and the communication network during downloading the second version of native software, the method comprising steps of:
- transmitting to the communication network a request to download the second version of native software, an authentication information validating eligibility of the wireless portable communication device to receive the second version of native software from the communication network, and hardware and software configurations of the wireless portable communication device;
- requesting the communication network to prepare the second version of native software for downloading to the wireless portable communication device;
- receiving from the communication network a permission to download the second version of native software;
- making memory space available by copying the user personal downloads in the network memory of the communication network;
- downloading the temporary downloading function in the memory space;
- enabling the temporary downloading function;
- receiving from the communication network the second version of native software;
- storing the second version of native software in the memory; and
- operating the wireless portable communication device using the second version of native software.

9. A method according to claim 8 wherein the step of storing the second version of native software in the memory further comprises a step of overwriting the first native software and the user personal downloads in the memory of the wireless portable communication device with the second version of native software.

10. A method according to claim 8, further comprising a step of removing the temporary downloading function from the memory of the wireless portable communication device after the second version of native software is stored in the memory.

11. A method in a wireless portable communication device having a first version of native software in memory for downloading a second version of native software, the method comprising steps of:
- transmitting a request to download the second version of native software;
- receiving a permission to download the second version of native software;
- making memory space available in the wireless portable communication device;
- downloading in the memory space a temporary downloading function capable of maintaining and controlling communication during downloading the second version of native software;
- enabling the temporary downloading function;
- receiving the second version of native software;
- storing the second version of native software in the memory; and
- operating the wireless portable communication device using the second version of native software.

12. A method according to claim 11, wherein the step of transmitting a request to download further comprises transmitting an authentication information validating eligibility of the wireless portable communication device to receive the second version of native software.

13. A method according to claim 12, wherein the step of transmitting a request to download further comprises transmitting a request to prepare the second version of native software for downloading to the wireless portable communication device.

14. A method according to claim 13, wherein the prepared second version of native software is in an appropriate binary image having internal address references of the software resolved specifically for the wireless portable communication device.

15. A method according to claim 11, wherein the step of storing the second version of native software in the memory further comprises a step of overwriting the first native software in the memory with the second version of native software.

16. A method according to claim 11, further comprising a step of removing the temporary downloading function from the memory after the second version of native software is stored in the memory.

* * * * *